United States Patent
Sharrow

(10) Patent No.: US 10,660,323 B1
(45) Date of Patent: May 26, 2020

(54) CLIP ON BAIT WELL

(71) Applicant: Christopher Sharrow, Niceville, FL (US)

(72) Inventor: Christopher Sharrow, Niceville, FL (US)

( * ) Notice: Subject to any disclaimer, the term of this patent is extended or adjusted under 35 U.S.C. 154(b) by 380 days.

(21) Appl. No.: 15/002,501

(22) Filed: Jan. 21, 2016

(51) Int. Cl.
*A01K 97/05* (2006.01)

(52) U.S. Cl.
CPC .................................. *A01K 97/05* (2013.01)

(58) Field of Classification Search
CPC .......... A01K 97/04; A01K 7/06; A01K 97/00; A01K 97/02; A01K 97/05; A01K 97/20
See application file for complete search history.

(56) References Cited

U.S. PATENT DOCUMENTS

| | | | |
|---|---|---|---|
| 278,947 A | 6/1883 | Harden | |
| 1,076,542 A | 10/1913 | Balch, Jr. | |
| 1,302,312 A | 4/1919 | Cook | |
| 1,354,660 A | 10/1920 | Kanthack | |
| 1,388,187 A | 8/1921 | Marble | |
| 1,465,814 A | 8/1923 | Forsburg | |
| 1,543,446 A | 6/1925 | Lundstedt | |
| 1,549,400 A | 8/1925 | Wimler | |
| 1,556,127 A | 10/1925 | Pruett | |
| 1,580,474 A | 4/1926 | Eckenbrecht | |
| 1,611,275 A | 12/1926 | Lewis | |
| 1,806,477 A | 5/1931 | Lloyd et al. | |
| 2,171,676 A | 9/1939 | Wallace | |
| 2,253,688 A | 8/1941 | Collins | |
| 2,292,709 A | 8/1942 | McCann | |
| 2,323,318 A | 7/1943 | Karkas | |
| 2,538,576 A | 1/1951 | Mavrakis | |
| 2,548,201 A | 4/1951 | Cromley | |
| 2,555,128 A | 5/1951 | Gutshall | |
| 2,560,381 A | 7/1951 | Babington | |
| 2,603,028 A | 7/1952 | Roberts | |
| 2,630,651 A | 3/1953 | McGee | |
| 2,822,116 A | 2/1958 | Smalley et al. | |
| 2,884,736 A | 5/1959 | Harrell | |
| 3,025,629 A | 3/1962 | Sears | |
| 3,053,005 A | 9/1962 | Byers | |
| 3,143,263 A | 8/1964 | Farmer | |
| 3,379,349 A * | 4/1968 | Hier ................... | F41C 33/0209 224/666 |
| 3,524,571 A | 8/1970 | Young et al. | |
| 3,553,880 A * | 1/1971 | Splickan ................ | A01K 97/20 43/55 |
| 3,559,329 A * | 2/1971 | Chiu ..................... | A01K 97/20 43/55 |

(Continued)

*Primary Examiner* — Thanh Pham
(74) *Attorney, Agent, or Firm* — Peter Loffler

(57) ABSTRACT

A live bait well has a body member formed from closed cell foam neoprene and has a generally U-shaped clip that extends upwardly from an upper edge of the body member, proximate the back, wherein the clip is used to attach the device to the waistband of a user's pants. A liner is removably disposed within an interior space of the body member to help protect the interior of the body member. The body member is formed from two similar sections that are joined together at inwardly directed side edges of each section so as to form a stiffening rib that runs between the first side and the opposing second side along the closed bottom. The open top of the body member is closed using a magnetic closure system.

6 Claims, 4 Drawing Sheets

(56) References Cited

U.S. PATENT DOCUMENTS

| | | | |
|---|---|---|---|
| 3,674,188 A | 7/1972 | Anderson | |
| 3,691,666 A | 9/1972 | Herdwig | |
| 3,886,679 A | 6/1975 | Marcell | |
| 3,949,916 A * | 4/1976 | Yount | A24F 23/04 224/240 |
| 4,008,540 A | 2/1977 | Brower | |
| 4,054,005 A | 10/1977 | Lightfoot | |
| 4,079,870 A * | 3/1978 | Clark | F41C 33/0227 224/246 |
| 4,174,585 A | 11/1979 | Beesley | |
| 4,303,185 A * | 12/1981 | Shoemaker | F41C 33/0227 224/193 |
| 4,323,181 A | 4/1982 | Spasoff | |
| 4,325,506 A * | 4/1982 | Lindell | F41C 33/0227 224/243 |
| 4,498,190 A | 2/1985 | Garlick, III | |
| 4,570,374 A | 2/1986 | Baxley | |
| 4,809,895 A * | 3/1989 | Peltier | F41C 33/0227 224/243 |
| 4,884,732 A | 12/1989 | Sunderland | |
| 4,971,236 A * | 11/1990 | Grummet | F41C 33/0209 224/193 |
| 4,980,988 A * | 1/1991 | Whitman | A01K 77/00 224/920 |
| 5,076,711 A * | 12/1991 | Koehler, Jr. | A45C 3/04 190/903 |
| 5,272,830 A | 12/1993 | Levin | |
| 5,297,706 A * | 3/1994 | Blitz | A47G 25/485 223/91 |
| 5,397,040 A * | 3/1995 | Lee | A01K 97/06 206/315.11 |
| 5,722,197 A * | 3/1998 | Albritton | A01K 97/06 43/55 |
| 6,105,305 A * | 8/2000 | Edens | A01K 97/20 224/406 |
| 6,209,769 B1 * | 4/2001 | Seals | A45C 1/04 224/583 |
| 7,958,667 B1 | 6/2011 | Pallack | |
| 8,371,061 B2 | 2/2013 | Bergers | |
| 8,615,921 B1 | 12/2013 | Weems | |
| 8,635,805 B1 | 1/2014 | Schmunk | |
| 8,756,856 B1 | 6/2014 | Girvin | |
| 8,794,475 B1 | 8/2014 | Daniels et al. | |
| 8,915,010 B1 | 12/2014 | Gardner | |
| 2004/0023574 A1 * | 2/2004 | Calkin | A62B 1/16 441/125 |
| 2009/0301911 A1 * | 12/2009 | Rubin | A01K 97/06 206/315.11 |
| 2015/0053811 A1 * | 2/2015 | Murray | A45F 5/02 242/588.1 |
| 2016/0135442 A1 * | 5/2016 | Saunders | A01K 97/06 43/25.2 |

* cited by examiner

CLIP ON BAIT WELL

BACKGROUND OF THE INVENTION

1. Field of the Invention

The present invention relates to a waist-worn bait well for holding live bait where a clip is used to attach the bait well to the top edge of a user's pants.

2. Background of the Prior Art

When a person is fishing, he or she often desires to carry fishing bait on his or her person, this being especially true during wade fishing or pedestrian fishing and when using live bait. In this manner, when additional bait is required, the bait is retrieved from the carrier, typically a live bait well that holds both bait and water, and the person continues on with the fishing task. Many devices have been proposed to accomplish this bait holding task. Such prior art devices, which come in a wide variety of architectures and work with varying degrees of efficiency and comfort, suffer from certain drawbacks.

Many body worn bait wells are complex in design and construction, making such devices not only expensive to produce, but also cumbersome to don and use. Often several steps are needed to open the device in order to gain access to the bait holding portion of the well and several more steps are needed to properly close the device and resume fishing. Other devices are either chest worn or back worn so as to be uncomfortable for the user as well as making access to the device and its contents difficult. Many waist worn bait wells require special straps or belts to be worn, adding to the expense of the device as well as to the bulk. Fishing is an all season sport so that the bait well is used in a wide range of temperatures, both air temperatures and water temperatures when wade fishing, and many devices fail to consider the need to keep the bait alive while held within the bait well, allowing the water within the bait well to quickly change to match the external temperature. Depending on this temperature to which the water changes, the bait within the well may quickly succumb to the temperature and die off.

What is needed is a bait well for holding live bait on the person of a fishing person which bait well addresses the previously mentioned shortcomings. Specifically, a bait well is needed that is simple in design and construction so as to be relatively inexpensive to produce as well as easy to operate. Such a bait well needs to be waist worn for ease of access without the need for special straps or the use of any belts. Such a bait well needs to protect the contents within the well from adverse temperature changes of the water within the well.

SUMMARY OF THE INVENTION

The clip on bait well of the present invention addresses the aforementioned needs in the art by providing a bait well that is of simple design and construction, being produced using standard manufacturing techniques, so as to make the device economically attractive to potential consumers for this type of device. Use of the clip on bait well is simple and straightforward without the need for elaborate procedures for gaining access to the bait held within the device. The clip on bait well is waist worn by a user and does not require the use of special straps or any belts to be donned. The clip on bait well insulates the contents of the bait well in order to protect the contents from adverse temperature shifts occasioned from the outside of the device being exposed to a temperature that is substantially different relative to the desired inside water temperature.

The clip on bait well of the present invention is comprised of a body member that has a closed bottom, an open top with an annular edge, a front and an opposing back joined by a first side and an opposing second side, an inner surface and an outer surface. The body member is formed from closed cell foam neoprene. A generally U-shaped clip extends upwardly from the annular edge at the back of the body member. A closure is located on the body member for closing the open top. The closure comprises a first magnetically attractive unit attached to the inner surface of the body member at the front proximate the top and a second magnetically attractive unit attached to the inner surface of the body member at the back proximate the top such that the first unit and the second unit are magnetically attractive with one another. The body member has a stiffening rib that runs down from the top at the first side, along the bottom, and up the second side terminating at the top thereat. At least one pocket is located on the outer surface of the body member. This external pocket may have an eyelet. A thin flexible liner is removably disposed within the body member for protecting the inner surface of the body member. The clip is formed from closed cell foam neoprene. A stiffening member is located on an inner surface of the clip.

BRIEF DESCRIPTION OF THE DRAWINGS

Similar reference numerals refer to similar parts throughout the several views of the drawings.

DESCRIPTION OF THE PREFERRED EMBODIMENT

Figure 1:
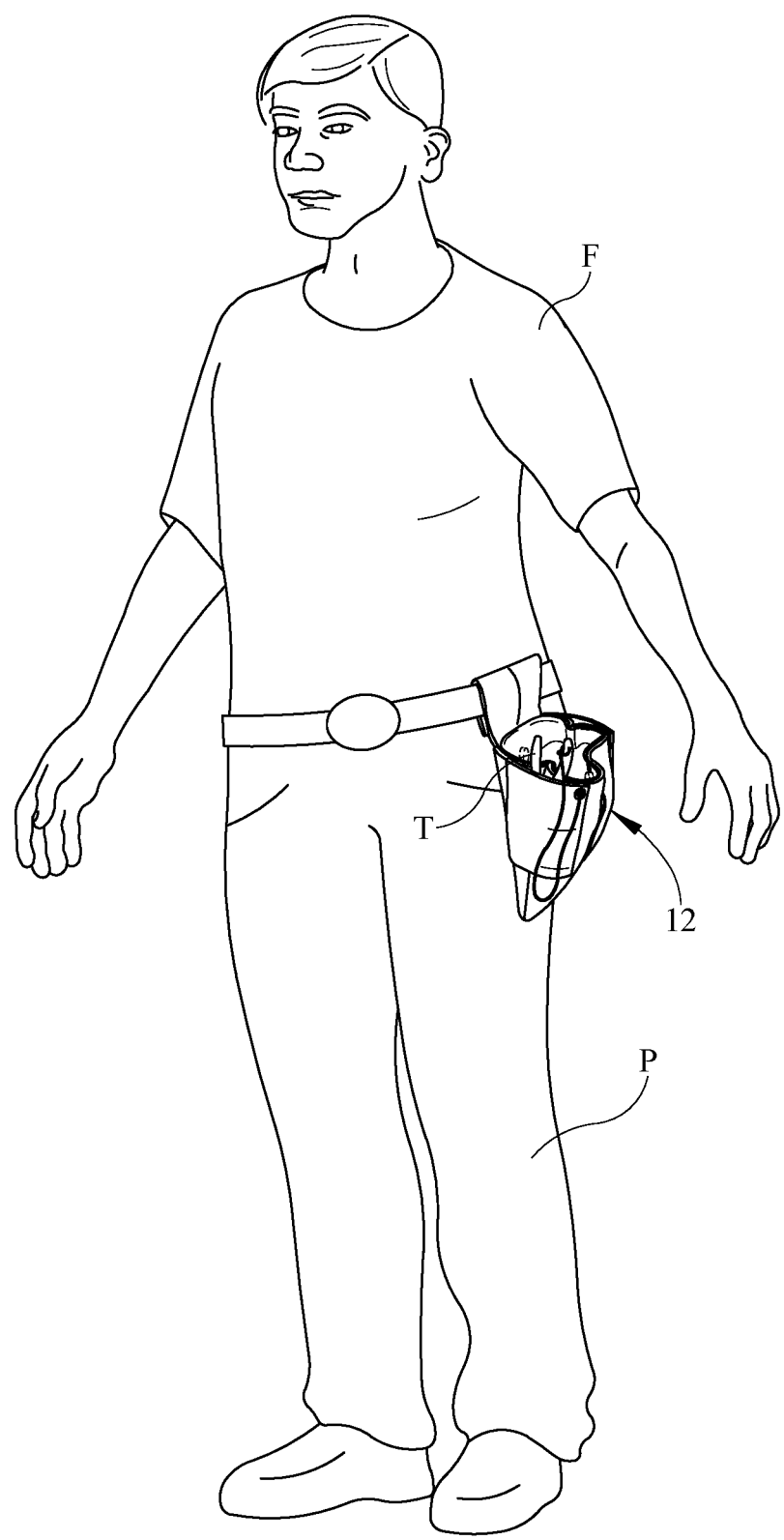
FIG. 1 is an environmental view of the clip on bait well of the present invention being worn by a fishing person.
Figure 2:
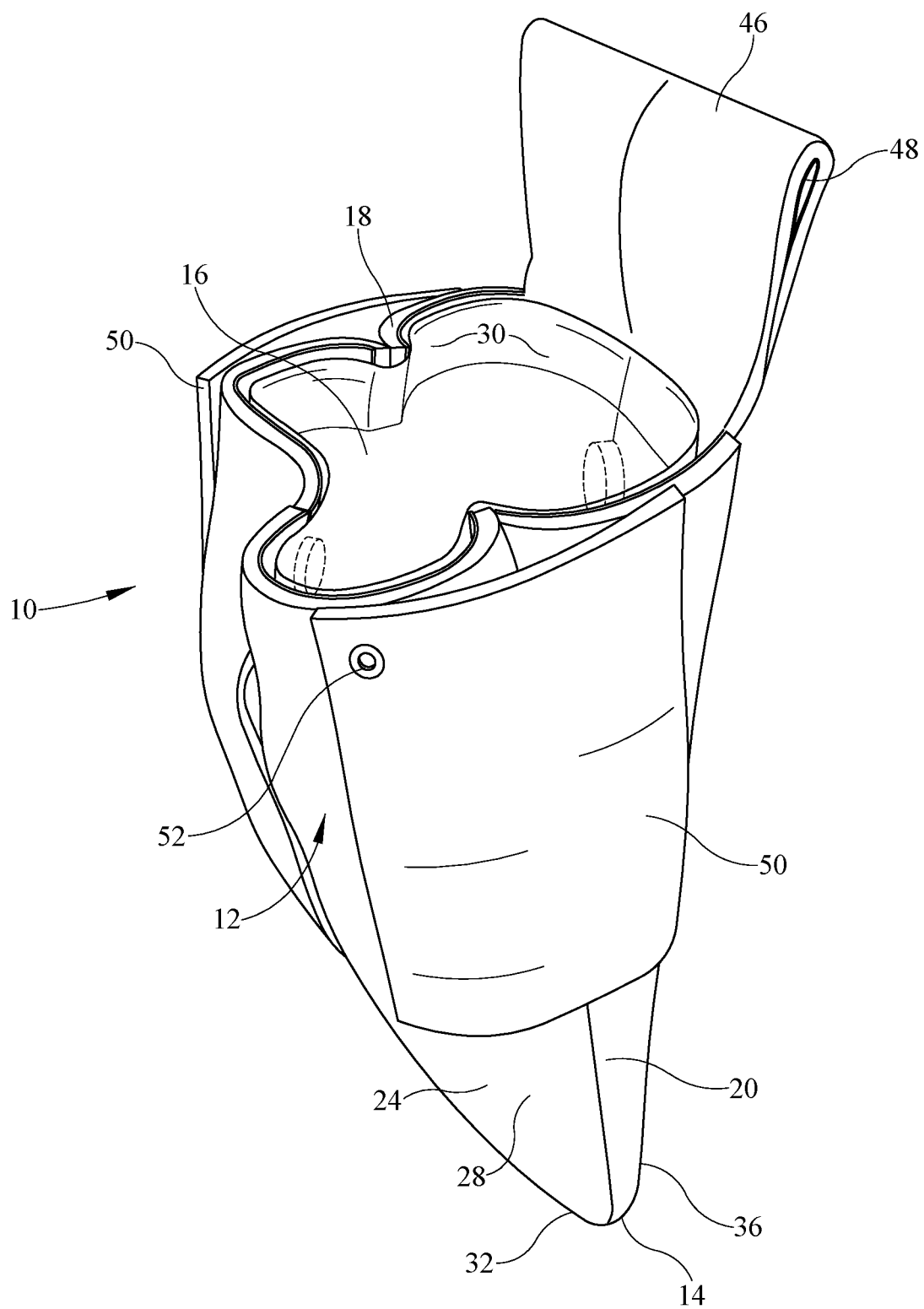
FIG. 2 is a right side perspective view of the clip on bait well.
Figure 3:
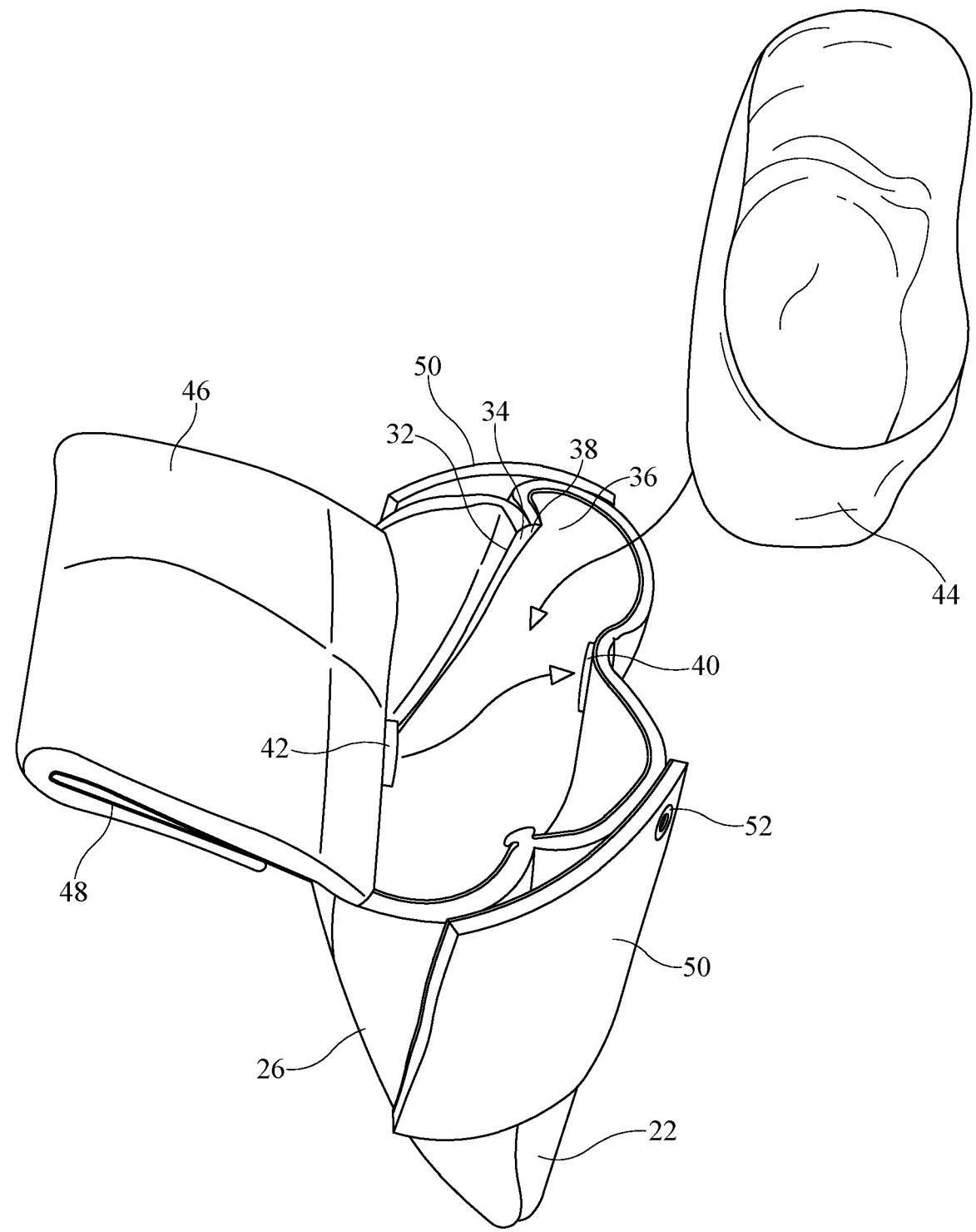
FIG. 3 is an upper left side perspective view of the clip on bait well illustrating the positioning of the liner.
Figure 4:
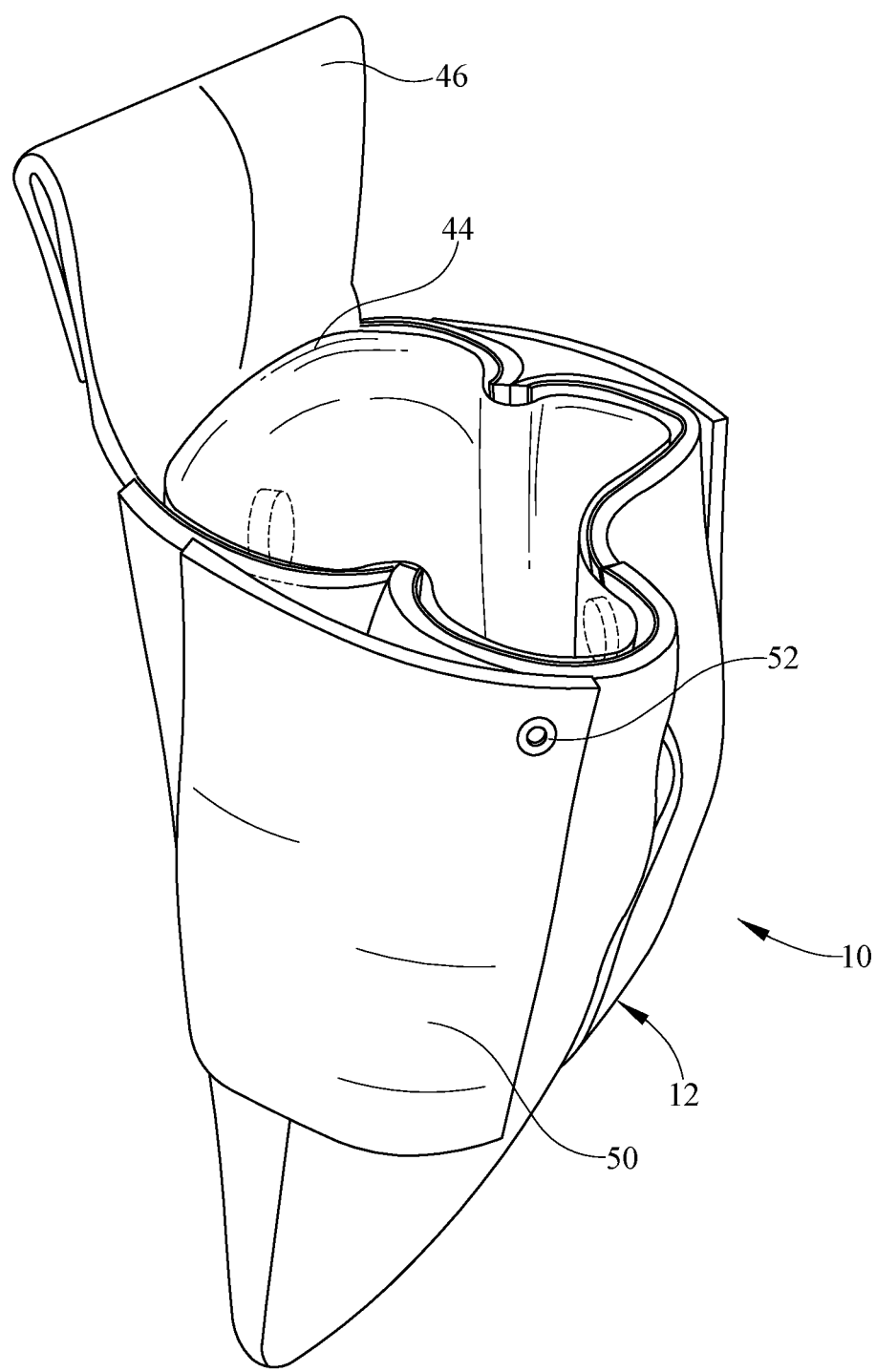
FIG. 4 is a left side perspective view of the clip on bait well.

Referring now to the drawings, it is seen that the clip on bait well of the present invention, generally denoted by reference numeral 10, is comprised of a body member 12 that has a closed bottom 14, an open top 16 with an annular edge 18, a first side 20, an opposing second side 22, a front 24, a back 26, an outer surface 28, and an inner surface 30. The body member 12 is made from a water impervious material such as wetsuit material, namely closed cell foam neoprene, in order to provide insulating properties to the interior of the device in order to insulate the contents therein. Although the body member 12 can be made from a single piece of material formed into the desired shape and the edges connected, by having the body member 12 made from a first section 32 with a first side edge 34 and a second substantially similar second section 36 with a second side edge 38 and turning the two side edges 34 and 38 inwardly so that the outer surfaces of each section 32 and 36 proximate their respective side edges 34 and 38 abut and thereafter attaching the two sections 32 and 36 thereat in appropriate fashion, gives the body member 12 a centrally disposed rib that helps stiffen the body member 12 which helps the body member 12 retain its shape and prevents the body member 12 from flopping about whenever the user F is moving.

As seen, a first magnetically attractive unit 40 is attached to the inner surface 30 of the body member 12 on the front 24 proximate the open top 16 while a second magnetically attractive unit 42 is attached to the inner surface 30 of the body member 12 on the back 26 proximate the open top 16 and facing the first magnetically attractive unit 40. At least one of the magnetically attractive units 40 or 42 is a magnet and if both units 40 and 42 are magnets, then the surface of the first magnetically attractive unit 40 that faces the surface of the second magnetically attractive unit 42 is of a different pole orientation relative to this second surface. The open top 16 of the body member 12 is closed by magnetically connecting the first magnetically attractive unit 40 with the second magnetically attractive unit 42.

A liner 44 is disposed within the body member 12. The liner 44, which is a thin flexible water impervious member, such as a plastic member, is attached to the body member 12 in any desired fashion such as via the use of a light adhesive used to adhere the outer surface of the liner 44 to the inner surface 30 of the body member 12 proximate each item's respective top.

A generally U-shaped clip 46 extends from the annular edge 18 of the body member 12 at the back 26. The clip 46 may be made from the same material used to form the body member 12 and may either be attached to the body member 12 in appropriate fashion or be integral with the body member 12. As seen, a stiffening member 48 is located on the inner surface of the clip 46, such stiffening member 48 being made from plastic or similar material.

Outer storage pockets 50 are located on one or both sides 20 and 22 of the body member 12 and are formed from the same material used to form the body member 12 and are attached to the body member 12 in any appropriate fashion. Each pocket 50 may have an eyelet 52 in order to allow bungee or other tethered attachment of a desired tool T to the pocket 50.

In order to use the clip on bait well 10 of the present invention, a liner 44 is positioned within the body member 12 and secured thereat. Water and bait are placed into lined body member 12 and the clip on bait well 10 is clipped to the top of a user's pants P via the clip 46. The clip 46 by being stiffened via the stiffening member 48, retains the clip on bait well 10 on the user's pants P in secure fashion without the need for the user F to don a belt, although a belt may be worn by the user F if desired. As the body member 12 is made from closed cell foam neoprene, the contents within the body member 12 are thermally insulated from the temperature on the outside of the body member 12 in order to help protect the contents within the body member from adverse temperature shifts. The user F can store various tools T within the pockets 50 and tether such tools T via the eyelets 52. Although not strictly needed, the use of the liner 44 helps with clean up as only the liner 44 needs to be cleaned or simply discarded and replaced after each use.

While the invention has been particularly shown and described with reference to an embodiment thereof, it will be appreciated by those skilled in the art that various changes in form and detail may be made without departing from the spirit and scope of the invention.

I claim:

1. A bait well comprising:

A water impervious body member, formed from a closed cell foam neoprene material, the body member having a water impervious closed bottom, an open top, a front and an opposing back joined by a first side and an opposing second side, an inner surface and an outer surface, such that the front, the back, the first side, and the second side form a water impervious cavity bounded by the inner surface, and such that the front, first side and second side have a continuous top edge at the open top and such that the back extends upwardly from the open top forming a generally U-shaped clip made from the closed cell foam neoprene material and such that a generally U-shaped stiffening member, corresponding to the shape of an inward facing surface of the U-shaped clip is located on the inward facing surface of the U-shaped clip; and a closure located on the body member for closing the open top.

2. The bait well as in claim 1 wherein the closure comprises a first magnetically attractive unit attached to the inner surface of the body member at the front proximate the top and a second magnetically attractive unit attached to the inner surface of the body member at the back proximate the top such that the first unit and the second unit are magnetically attractive with one another.

3. The body member as in claim 1 wherein the body member has a stiffening rib that runs down from the top at the first side, along the bottom and up the second side terminating at the top thereat.

4. The body member as in claim 1 comprising at least one pocket located on the outer surface of the body member.

5. The body member as in claim 4 where the pocket has an eyelet.

6. The bait well as in claim 1 further comprising a thin flexible liner removably disposed within the body member.

* * * * *